United States Patent [19]
Goguen et al.

[11] Patent Number: 5,174,241
[45] Date of Patent: * Dec. 29, 1992

[54] ANIMAL SHIPPING CONTAINER

[75] Inventors: George Goguen, Cambridge; Shelley C. Norton, Boston, both of Mass.

[73] Assignee: Habistat Corporation, Boston, Mass.

[ * ] Notice: The portion of the term of this patent subsequent to Dec. 11, 2007 has been disclaimed.

[21] Appl. No.: 598,034

[22] Filed: Oct. 16, 1990

Related U.S. Application Data

[63] Continuation of Ser. No. 278,670, Dec. 1, 1988, Pat. No. 4,976,219.

[51] Int. Cl.$^5$ .............................................. A01K 15/00
[52] U.S. Cl. ......................................... 119/15; 119/17
[58] Field of Search .............................. 119/15, 17, 19

[56] References Cited

U.S. PATENT DOCUMENTS

| | | | |
|---|---|---|---|
| 3,326,186 | 6/1967 | Doll | 119/19 |
| 3,343,520 | 9/1967 | Schwarz, Jr. | 119/15 |
| 4,313,958 | 12/1968 | Artig | 119/15 |
| 3,490,417 | 1/1970 | Swinney | 119/19 |
| 3,528,390 | 9/1970 | Lee | 119/15 |
| 3,537,428 | 11/1970 | Montgomery | 119/15 |
| 3,613,639 | 10/1971 | Lee | 119/15 |
| 3,626,902 | 12/1971 | Orfei | 119/15 |
| 3,695,233 | 10/1972 | Kovarik | 119/19 |
| 3,771,686 | 11/1973 | Brison | 119/19 |
| 3,791,346 | 12/1974 | Willinger et al. | 119/15 |
| 4,215,649 | 8/1980 | Vorbeck | 119/17 |
| 4,593,650 | 6/1986 | Lattuada | 119/17 |
| 4,640,228 | 2/1987 | Sedlacek et al. | 119/17 |
| 4,696,257 | 9/1987 | Neary et al. | 119/19 |
| 4,763,607 | 8/1988 | Tominaga | 119/17 |
| 4,976,219 | 12/1990 | Goguen et al. | 119/15 |

*Primary Examiner*—Paul J. Hirsch
*Attorney, Agent, or Firm*—Fish & Richardson

[57] ABSTRACT

A container for shipment of a laboratory-type animal, the container including a base formed of animal restraining material, disposed thereabove a load-bearing element formed of air-passing, animal restraining material. Protective means cover sharp protuberances on the external surface of the base and load bearing element, and further have a smooth external surface lacking sharp protuberances. In a first embodiment, the material of the base is liquid impermeable; in a second embodiment, the base includes liquid-passing material. Also disclosed is a method for assembly of the container.

4 Claims, 8 Drawing Sheets

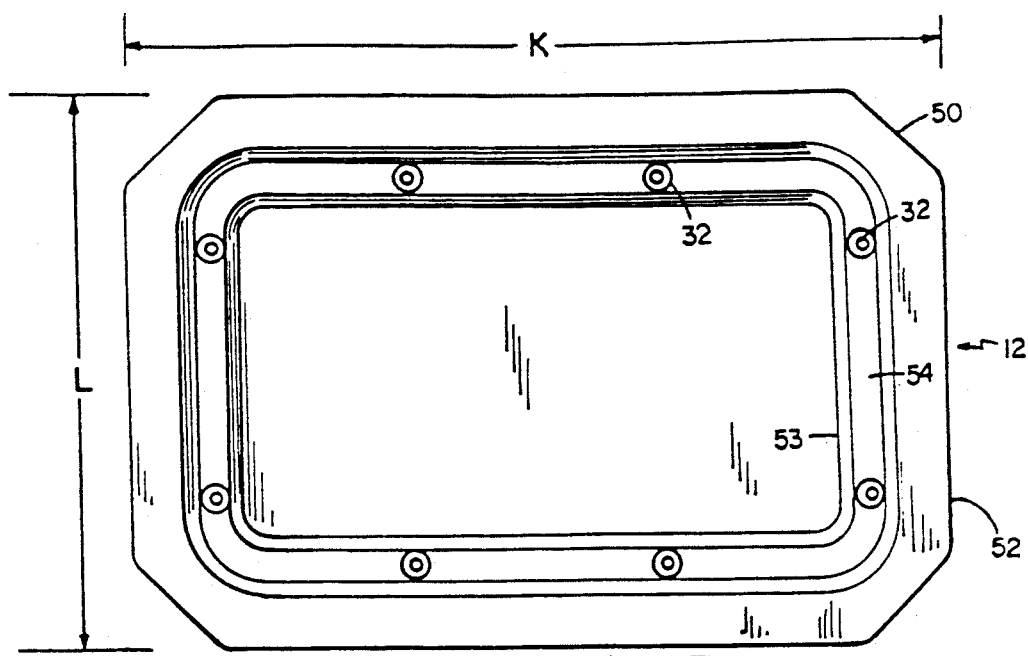
FIG.3
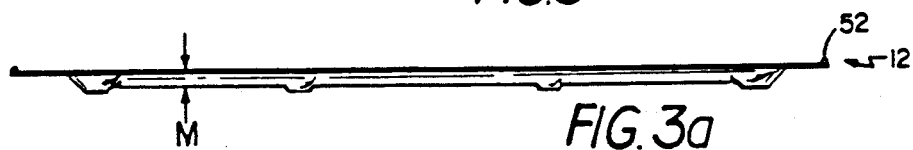
FIG.3a
FIG.4a  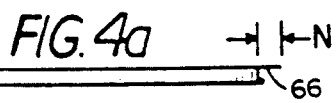  FIG.5a
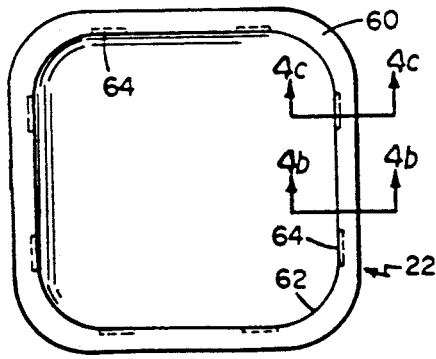
FIG.4
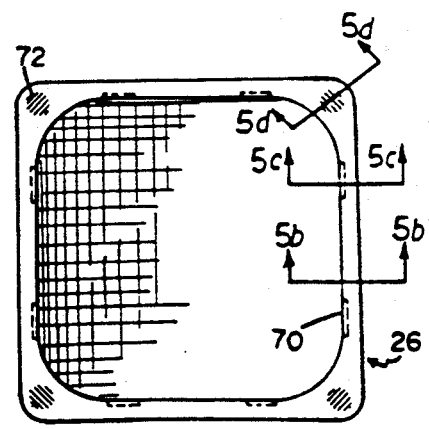
FIG.5
FIG.5d ~~~~~
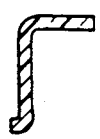
FIG.4b
FIG.4c
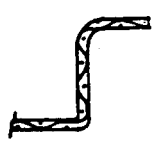
FIG.5b
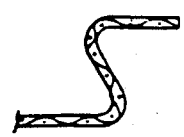
FIG.5c

ANIMAL SHIPPING CONTAINER

This is a continuation of application Ser. No. 07/278,670, filed Dec. 1, 1988, and issued Dec. 11, 1990 as U.S. Pat. No. 4,976,219.

BACKGROUND OF THE INVENTION

This invention concerns shipping containers for animals, e.g. laboratory animals such as mice, rats, and the like.

Laboratory animals are generally shipped from a supplier to a laboratory in shipping crates formed of cardboard and lined with wire mesh. For example, Charles River Laboratories regularly uses a cardboard box of about 24½ inches × 16½ inches × 5½ inches held together by staples. Miller (U.S. Pat. No. 2,530,170) describes animals crates formed of paper and wire, with drainage openings in the bottom of the crate. Vorbeck (U.S. Pat. No. 4,215,649) and Ziller (U.S. Pat. No. 4,334,500) describe turtle crates having single gas-impermeable canopies and gas transfer membranes which allow air exchange but not bacterial or viral transfer. Sedlacek (U.S. Pat. No. 4,480,587 and U.S. Pat. No. 4,640,228) also describes cages having air filters.

SUMMARY OF THE INVENTION

This invention provides an animal shipping container designed to fit the following criteria: (a) the container is formed of a material which is readily available in the marketplace and easily disposed of within environmental regulations; (b) the container is constructed such that the temperature within the container loaded with animals remains tolerable under normal conditions of use, that is the container is shaped for improved air circulation about the containers for animal comfort and health; (c) the container is designed such that humidity, moisture, and ventilation are maintained at levels such that there is minimal condensation on the interior surface of the container, or on the animals per se; and such that fluids (e.g., urine) are contained from leakage between containers for improved shipping conditions; (d) the material is economically transported from a central location; (e) assembly of the container can be easily performed; (f) the container conforms to present government regulations regarding containment of animals, for example, Title 9, Section 3.36 (primary enclosures used to transport live guinea pigs and hamsters); (g) the container design allows stacking of the container such that a large number of animals can be shipped within a single truck; (h) the container has an opening sized and shaped to allow introduction of animals by standard procedures, for example, by use of a shipping chute; (i) upon assembly, sharp edges from wire mesh are eliminated; (j) the container may be shipped in an unassembled form which is cost efficient and does not require excessive storage space for raw material; (k) the container is translucent; (L) the container can be decontaminated upon delivery with a cold liquid disinfectant such as Clydox, sodium hypochlorite, or ethylene oxide gas; (m) the container is easy to open and staples are only optionally required in its assembly; and (n) the container includes an outer surface formed of material which will not absorb moisture from urine or the shipping diet contained in the container.

Other features include the provision of a container designed for easy application of all documentation and labeling; the container is manufactured of a material which allows printing and necessary graphics; and the top of the container has a transparent observation port so that the condition of the animals can be evaluated upon receipt by a customer.

In a first aspect, the invention features a container for shipment of a laboratory-type animal, including a base formed of animal restraining, liquid impermeable material, disposed thereabove and defining with the base an animal shipment container volume, a load bearing element formed of air passing, animal restraining material; and protective means adapted to cover sharp protuberances on external surfaces of the base and the load bearing element, the protective means further having a smooth external surface lacking sharp protuberances.

In preferred embodiments, the load bearing element of the container includes a light translucent air passing filter element; the load bearing element defines an aperture positioned and sized to allow introduction and removal of an animal from the container volume; the protective means includes a perimeter lip disposed about the base, wherein the load bearing element is sized and constructed for engagement within the perimeter lip; the container further includes a cover sized and shaped to fit within the aperture, the cover including restrainer means of an animal restraining material; the cover further includes a retaining seal sized to fit within the aperture, the seal being sized and shaped for engagement with the restrainer means; the cover is sized and adapted for snap fit into the aperture; the base and load bearing element are fixed together by adhesive or mechanical fastener; the load bearing element is formed of perforated metal; the base being formed of plastic; the base defines at least one protuberance sized and constructed to abut with the container from a load bearing element of a second container positioned below the container; the base defines a trough positioned to accept liquid from animals in the container; the base element defines positioning means for preventing lateral movement of a container disposed upon the load bearing element of another container; and the load bearing element has a rectangular dome shape.

In a second aspect, the invention features a method for assembling a container for shipment of a laboratory-type animal, including the steps of a) providing a base formed of animal restraining, liquid impermeable material; b) providing a load bearing element formed of air-passing, animal-restraining material, the load bearing element and the base together defining an animal shipment container volume; c) positioning the load bearing element above the base; d) providing protective means shaped to cover any sharp protuberances on the external surfaces of the base and the load bearing element, the protective means having a smooth external surface lacking sharp protruberances; and e) fixing the load bearing element and the base together to form the container.

In preferred embodiments, the protective means includes a perimeter lip about the base, and the load bearing element is sized and constructed for engagement within the perimeter lip, and the method further includes fixing the base and the load bearing element by application of an adhesive or staples; the adhesive is hot melt adhesive, and the method further includes the step of placing the adhesive either in the base, or on the load bearing element and heating the container to melt the adhesive; and the method further includes the step of applying pressure to the animal container assembly to hold individual components together during the heating step.

In a third aspect, the invention features a container for shipment of a laboratory type animal, the container including a base comprising a first base element formed of animal-restraining, liquid-passing material, and, disposed thereabove and defining with the base an animal shipment container volume, a load bearing element formed of air passing, animal restraining material. The container further comprises protective means that cover sharp protuberances on the external surface of the base and load bearing elements, the protective means further having a smooth external surface lacking sharp protuberances.

In preferred embodiments, the container includes a light translucent, air passing filter element positioned about or within the load bearing element; the base includes a second base element of liquid-impermeable material positioned below the first base element; the container further includes a liquid absorbent element positioned below the first base element and preferably between the first and second base elements; the load bearing element defines a first aperture positioned and sized to allow introduction and removal of an animal from the container volume; the light translucent air passing filter element defines a second aperture corresponding to the first aperture; the protective means includes an air filter element disposed about or within the load bearing element, and a second base element disposed below the first base element, these elements being sized and constructed for engagement about the base and load bearing element defining the animal container volume; a cover is provided, sized and shaped to fit within the corresponding first and second apertures, most preferably, the cover includes restrainer means of an animal restraining material, and further includes a retaining seal sized to fit within the corresponding first and second apertures, the seal being sized and shaped for engagement with the restrainer means; even more preferably, the cover further includes air passing material positioned above the air restraining material, and the cover is sized and adapted for snap fit into one or both of the apertures; the first base element, the light translucent filter element, the second base element and the load bearing element are fixed together by adhesive or mechanical fasteners; the first base element and the load bearing element are formed with wire mesh; the light translucent filter element and the second base element are formed of plastic; the second base element defines at least one protruberance sized and constructed to offset the container from a load bearing element of a second container positioned below the container; the second base element defines a trough positioned to accept liquid from animals in the container; the second base element defines positioning means for preventing lateral movement of a container when it is disposed upon the load bearing element of another container; the load bearing element has a rectangular dome shape; and the securing means is adhesive or staples.

In a related aspect, the invention features a method for assembling a container for shipment of a laboratory type animal, including the steps of providing a base having a first base element formed of animal restraining liquid passing material; providing a load bearing element formed of air passing animal restraining material, the load bearing element and base together defining an animal shipment container volume; positioning the load bearing element above the base; providing protective means shaped to cover any sharp protuberance on the external surfaces of the base and the load bearing element, the protective means having a smooth external surface lacking sharp protuberances; and fixing the protective means, the load bearing element and the base together to form a container.

In preferred embodiments, the protective means includes in combination a light translucent air passing filter element and a liquid impermeable second base element and the method further includes the step of fixing the filter and the liquid impermeable second base element about the first base element and the load bearing element by adhesive or mechanical fasteners; most preferably the adhesive is hot melt adhesive and the method further includes placing the adhesive either in the base or on the load bearing element and heating the container to melt the adhesive; even more preferably, the method further includes applying pressure to the animal container assembly to hold individual components together during the heating step.

This invention also features a stack of the above containers positioned with lower base surfaces disposed above upper surfaces of load bearing elements of an immediately underlying container.

The shipping containers of this invention are generally single use shipping containers for small laboratory animals. They are generally constructed of a thermoformed plastic base tray, a wire mesh base and load bearing dome defining the secure container volume and a cover. The design allows a simple assembly procedure to be used without the need for staples or other mechanical fasteners, and eliminates hazards to animals and laboratory personnel alike by either sealing or obstructing access to dangerously sharp wire screen edges. A filter dome, nested closely with the wire mesh dome, may be included to protect viral antibody free animals from contamination. The geometry of the container allows triaxial air circulation (e.g. arrows X, Y and Z, FIGS. 7-7b) even when stacks are placed compactly adjacent each other.

Integral projections of the base allow air circulation, and thus cooling, when rested on a flat surface. Animals are readily inserted into the container through an aperture in the dome cover. This cover is mesh lined, and permits visual inspection of the animals. The cover may be repeatedly removed and resealed without adhesives or fasteners. As mentioned, air circulation is possible in all three dimensions around the containers, and since the base does not leak or become moist, transmission of liquid borne disease between containers is reduced.

The shipping container of this invention is lightweight, moisture resistant and escape resistant. It is made of non toxic materials, and may be made as a finished unit or as subassemblies ready for finishing at the point of use. These subassemblies rest compactly together for good shipping and storage density, and are assembled on single piece semi automatic equipment.

Other features and advantages of the invention will be apparent from the following description of the preferred embodiments thereof, and from the claims.

DESCRIPTION OF THE PREFERRED EMBODIMENTS

The drawings will first briefly be described.

DRAWINGS

FIGS. 3 and 3a are, respectively, a top view and side view of a base tray;

FIGS. 4, 4a, 4b and 4c are, respectively, a top view, side view and two sectional views of a retaining ring seal;

FIGS. 5, 5a, 5b, 5c and 5d are, respectively, a top view, side view and sectional views of a wire mesh cover.

STRUCTURE

Figure 1:
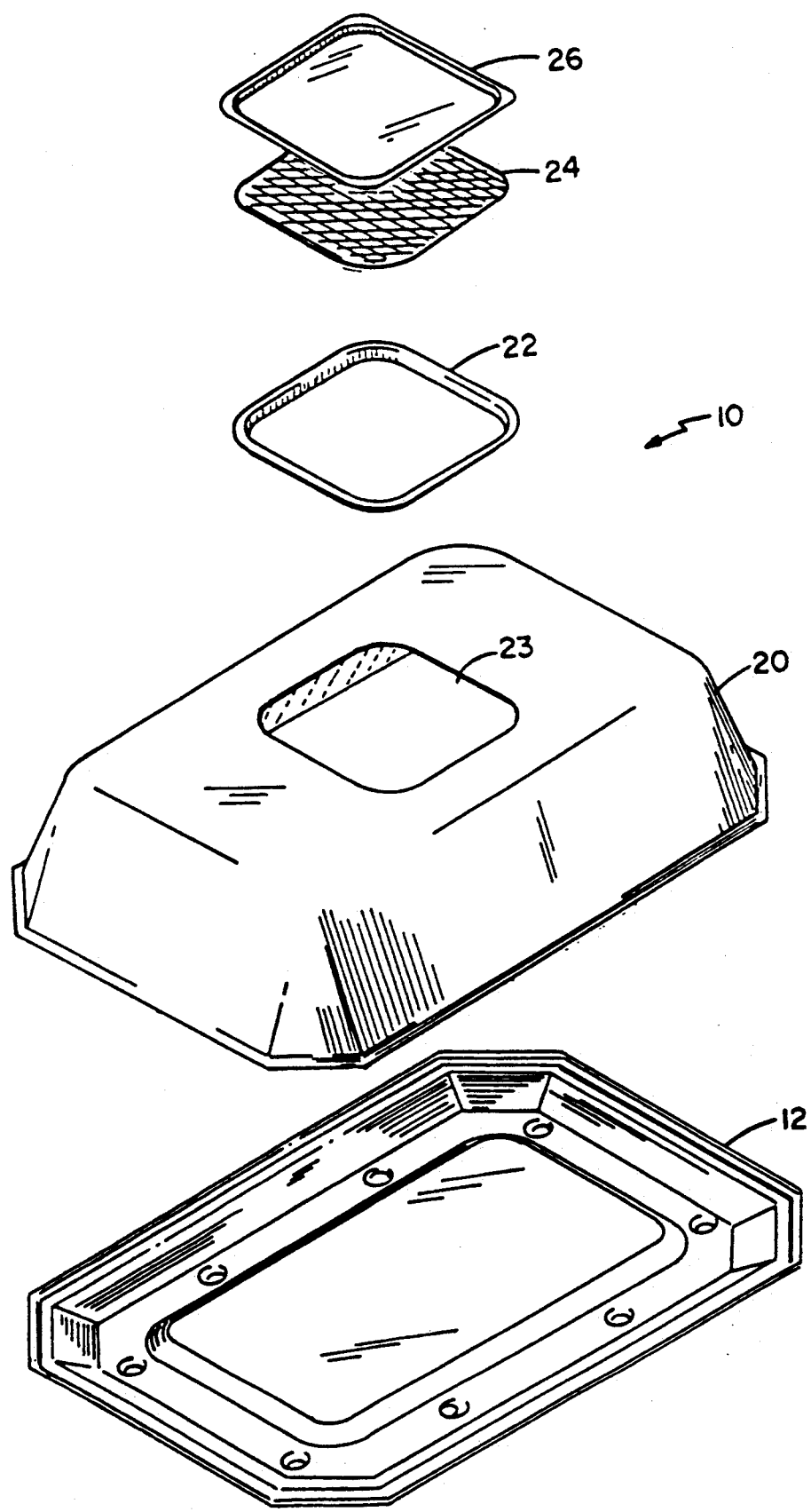
FIG. 1 is an exploded isometric view of an animal shipment container of the invention.

Referring to FIG. 1, animal shipment container 10 of the invention consists of a thermoformed or injection molded polyolefin base tray 12, a load bearing filter dome 20 formed of expanded or perforated metal e.g., aluminum or tin steel laminated to spun bonded polyester or polypropylene. Also provided is a retaining seal 22 sized for sealing fit within a corresponding aperture 23 in filter dome 20, and a wire mesh restrainer 24 adhesively fixed to a polyolefin or polycarbonate cover 26.

Figure 1A:
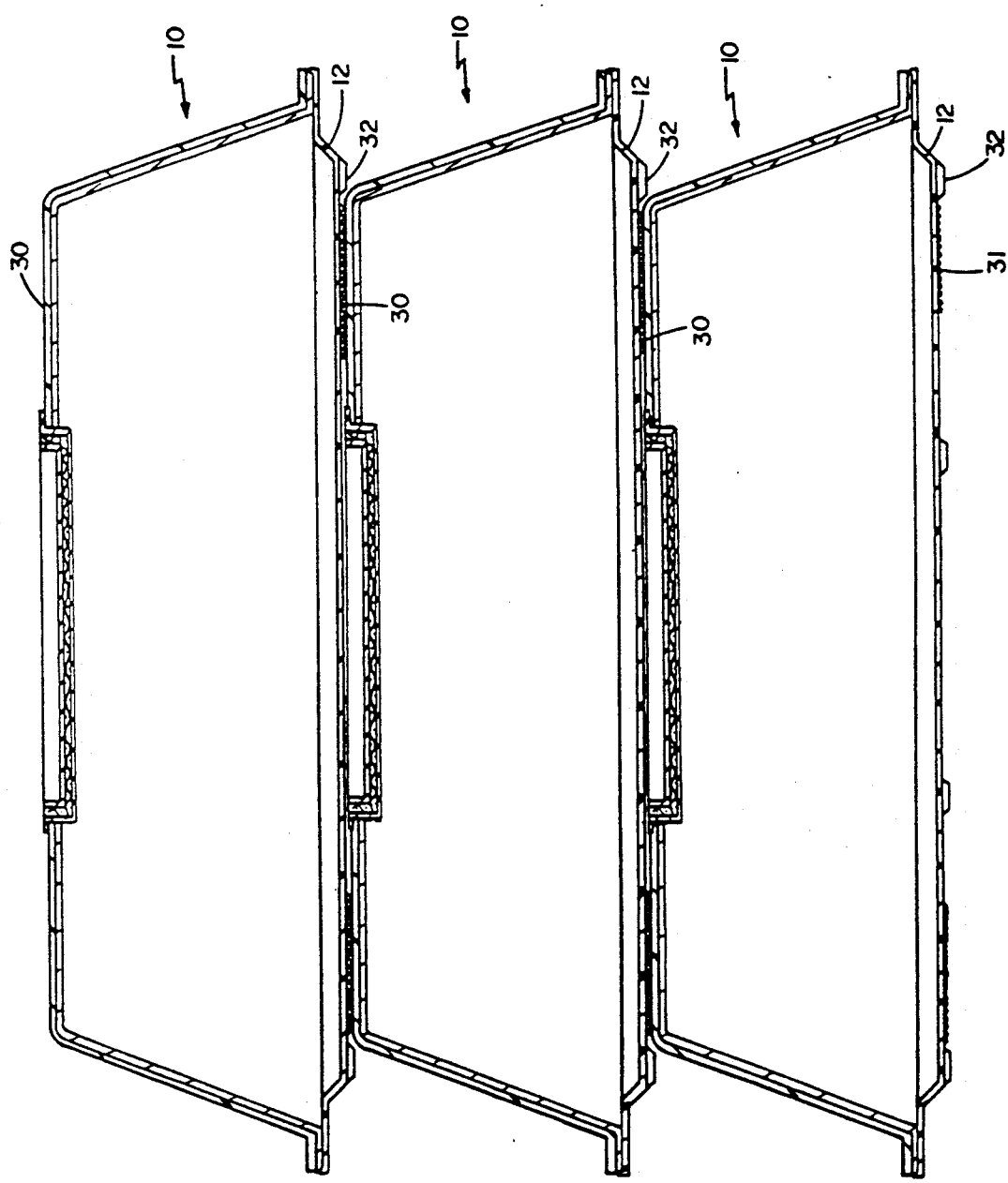
FIG. 1a is a cross-sectional view of a stack of animal shipment containers of FIG. 1.

Referring to FIG. 1a, a series of containers 10 can be stacked one upon the other with base tray 12 positioned over the upper surface 30 of a filter dome 20. Base tray 12 is provided with multiple protrusions 32, e.g. six are shown, positioned closely about the sloping edges of filter dome 20 of an underlying container to thus hold a first container 10 laterally in position above a second container 10. Also provided are 1-3 mm detents 31 on the lower surface of base tray 12 which create an airway between two containers 10 placed on top of one another, and thus allow better air circulation.

Figure 2:
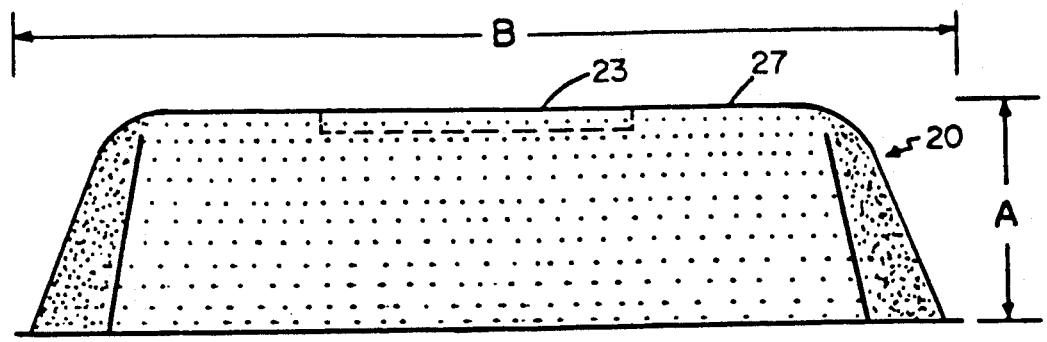
FIGS. 2, 2a and 2b are, respectively, a side view, end view and top view of a perforated metal filter dome.
Figure 2A:
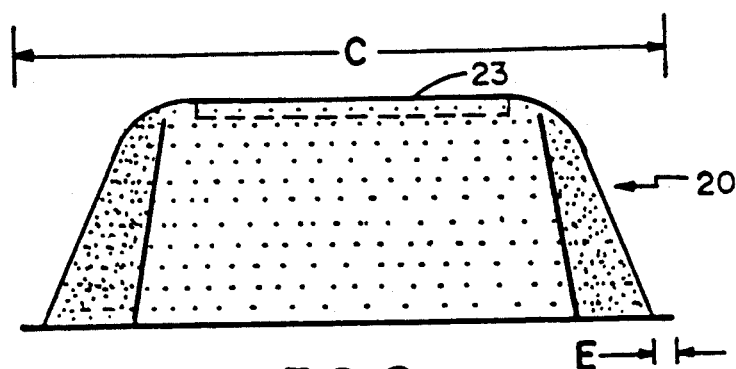
Figure 2B:
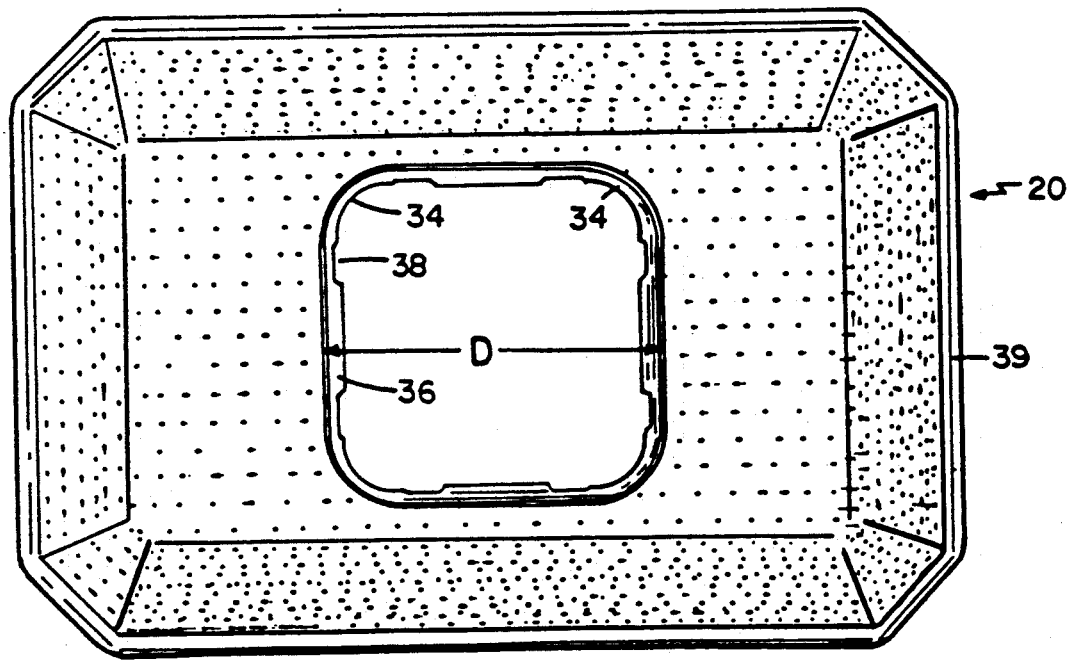

Referring to FIG. 2, filter dome 20 is formed of air permeable material having a height A, e.g. 6.0 inches, a length B, e.g. 24.25 inches, and a width C, e.g. 16.25 inches. Aperture 23 is centrally located in the upper surface 27 of filter dome 20, and is sized and shaped for sealing fit with retaining seal 22 (e.g., FIG. 4 et seq.), having a generally rectangular perimeter of width D, e.g. 8.19 inches, and rounded corners 34. Tongue regions 36 and groove regions 38 are provided for mating with retaining seal 22. A flange 39 of width E, e.g. 0.53 inch, is provided around the perimeter of filter dome 20. Filter dome 20 is designed to allow rapid heat and moisture dissipation with a maximal unobstructed surface area. Light is diffused through dome 20, and flange 39 provides a positive seal at the edges of container 10.

Referring to FIG. 3, base tray 12 is formed of thermoformed or injection molded polyolefin. It has a length K, e.g. 24.5 inches, a width L, e.g. 16.5 inches, and a depth M, e.g. 0.68 inch. Base tray 12 is generally rectangular in shape having bevelled or rounded corners 50, and a rim 52 of height, e.g. 0.06 inch, around the perimeter of base tray 12. Trough 54, positioned about 1.5 inches from perimeter lip 52 (of height about 0.15 inch), with a depth of about 0.44 inch, has protrusions 32 equally spaced therealong. Inner perimeter 53 of trough 54 has a length of 17.94 inches and a width of 9.94 inches, slightly larger than that of the upper surface of filter dome 20. Protrusions 32 closely surround the sloping sides 55 of a filter dome 20 when base tray 12 of a first container is placed upon filter dome 20 of a second, underlying container. Trough 54 receives and retains any excess liquid in container 10 not absorbed by any provided bedding material and further aligns stacked containers.

Referring to FIG. 4, retaining seal 22 is molded from 0.4 inch thick, high density polyethylene or other polyolefin. Seal 22 is generally square, with a width of 8.5 inches. Corners 60 of seal 22 are rounded and inner perimeter 62 is provided with projecting regions 64, shown in cross-section in FIG. 4c. Regions 64 are suitable for mating with lip regions 38 of filter dome 20. Retaining ring 22 is also provided with an outer perimeter flange region 66 of width 0.45 inch.

Referring to FIG. 5, cover 26 is thermoformed from 0.03 inch thick transparent polyvinylchloride or oriented polystyrene plastic, generally rectangular in shape with a width of 8.31 inches. The cover snap fits into retaining ring 22 and holds optional wire mesh 24 firmly in position. Protruding regions 70 are provided for mating of the cover assembly with filter dome 20, and for mating of the cover with protrusions 64 of retaining ring 22. Non-slip circular tabs 72 are provided for allowing removal of cover 26 from the dome; and the cover may be easily, and securely, replaced in position. Cover 26 snap fits into retaining ring 22 and holds wire mesh 24 firmly in position.

ASSEMBLY

Referring to FIG. 1, container 10 is assembled by placing each of the components in a stack as shown. A hot melt adhesive, e.g. Bostick #8330 polyolefin base, is pre-extruded around the inner part of perimeter lip 52 of filter dome 20, and dome 20 placed within perimeter lip 52 such that flange 39 abuts lip 52. When the components are assembled, they are clamped in place by a standard clamp or by a machine designed to hold flange 39 closely in contact with tray 12. The assembly is then placed at a temperature sufficient to melt the adhesive (e.g., 152°-176° F.) such that the adhesive passes through each of the layers. After cooling, the adhesive firmly holds the assembled components in their final position. Retaining ring 22 is permanently attached within aperture 23 by one of adhesive as described above. Wire mesh 24 is attached by glue to cover 26 and this assembly pushed into retaining ring 22. Cover 26 prevents access to the edges of wire mesh 24, and can be readily removed, as reguired, from retaining ring 22 to allow access to the dome interior.

OTHER EMBODIMENTS

Figure 6:
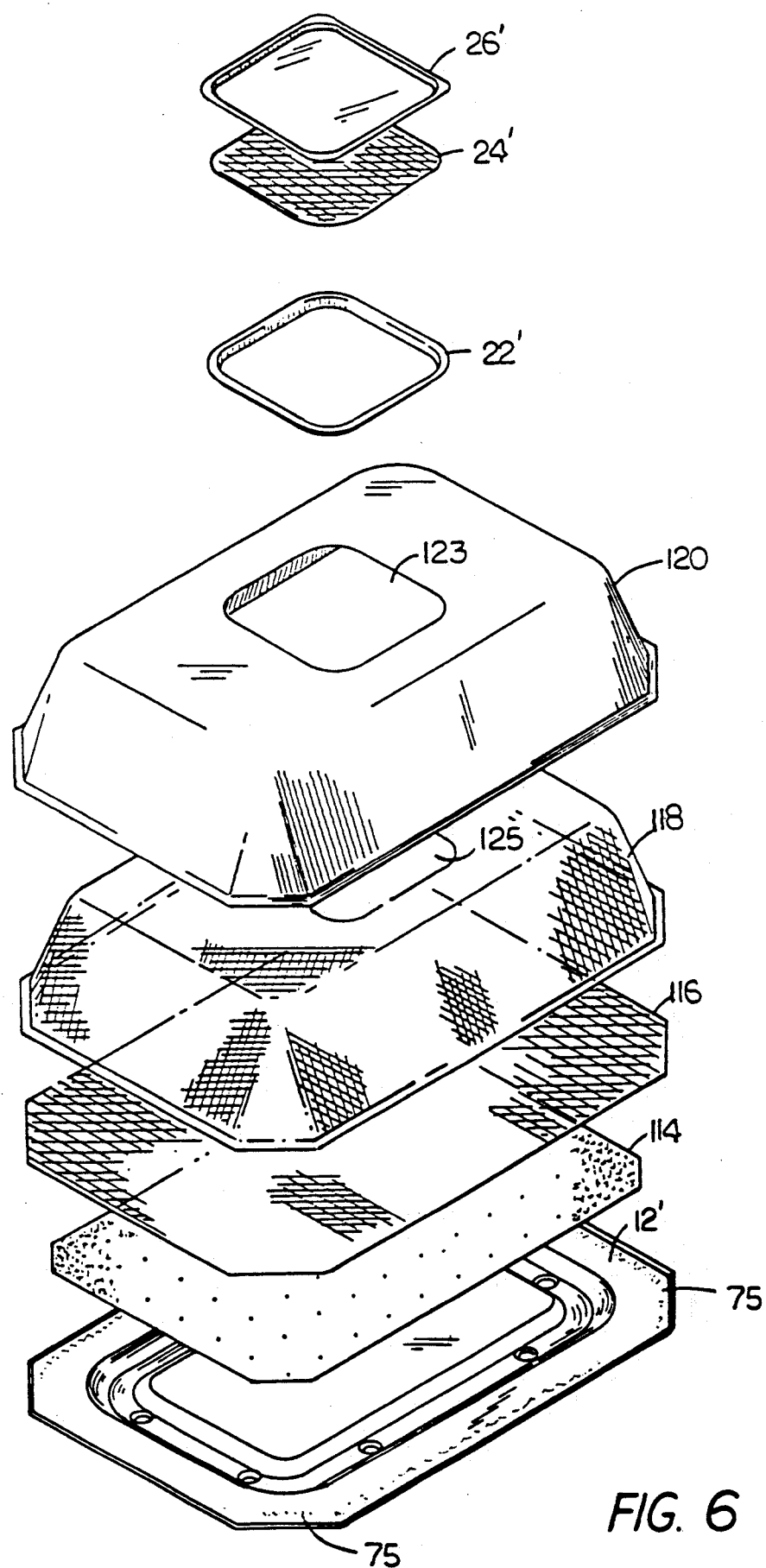
FIG. 6 is an exploded isometric view of an alternative embodiment of an animal shipment container.

Other embodiments are within the following claims, for example, the filter dome may be formed from two components, and a base mat provided with the base tray, as follows. Referring to FIG. 6, animal shipment container 10' of the invention consists of a thermoformed polyolefin base tray 12', a hydrophilic nonwoven mat 114, a cut wire mesh floor 116, a formed wire mesh dome 118 and an opaque melt blown polypropylene filter dome 120. Also provided is a retaining seal 22' sized to fit sealing within corresponding aperture 123 (in filter dome 120) and 125 (in wire mesh 118); and a wire mesh restrainer 24' adhesively fixed to a polyvinylchloride cover 26'.

Figure 6A:
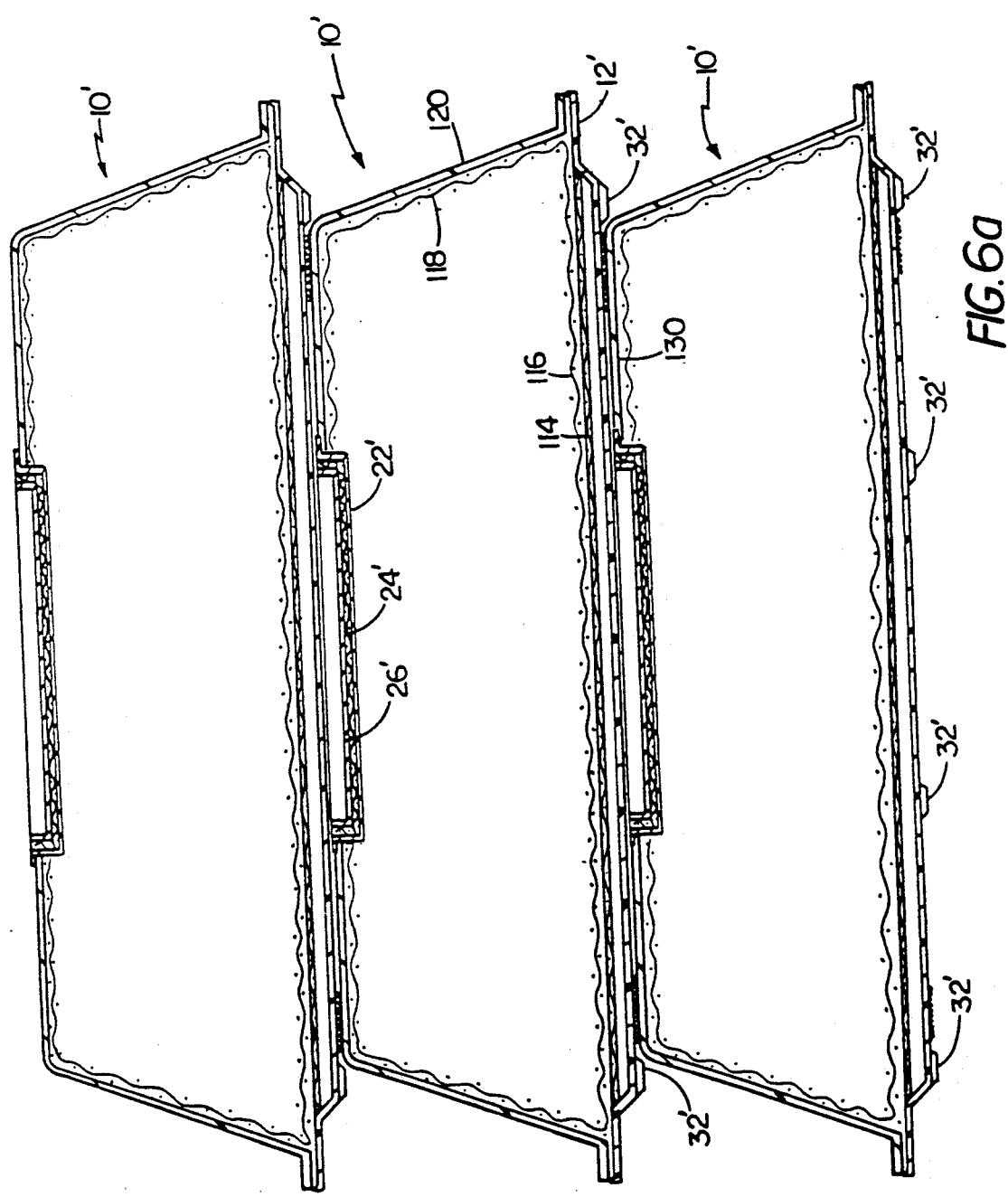
FIG. 6a is a cross-sectional view of a stack of containers of FIG. 6.

Referring to FIG. 6a, a series of containers 10' can be stacked one upon the other with base tray 12' positioned over the upper surface 130 of a filter dome 120. Base tray 12' is provided with multiple protrusions 32', e.g. six are shown, positioned closely about the sloping edges of the filter dome 120 of an underlying container to thus hold a first container 10' laterally in position above a second container 10'.

Figure 7:
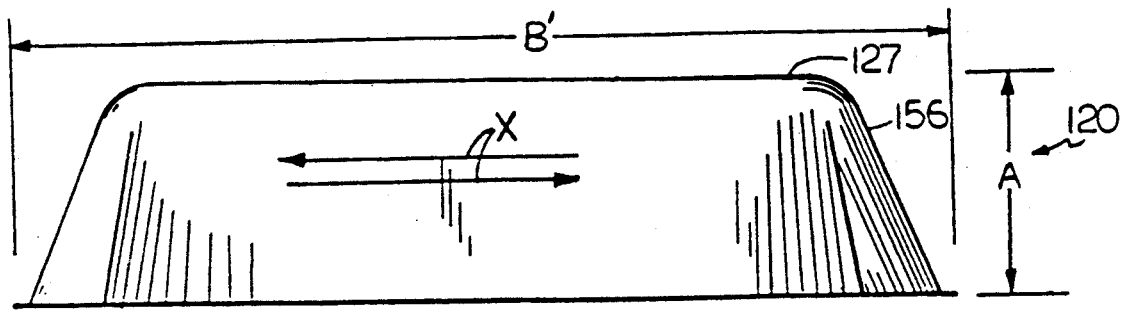
FIGS. 7, 7a and 7b are, respectively, a side view, end view and top view of a filter dome.
Figure 7A:
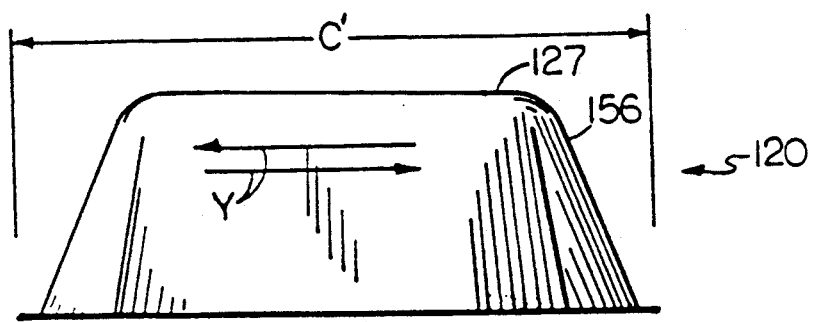
Figure 7B:
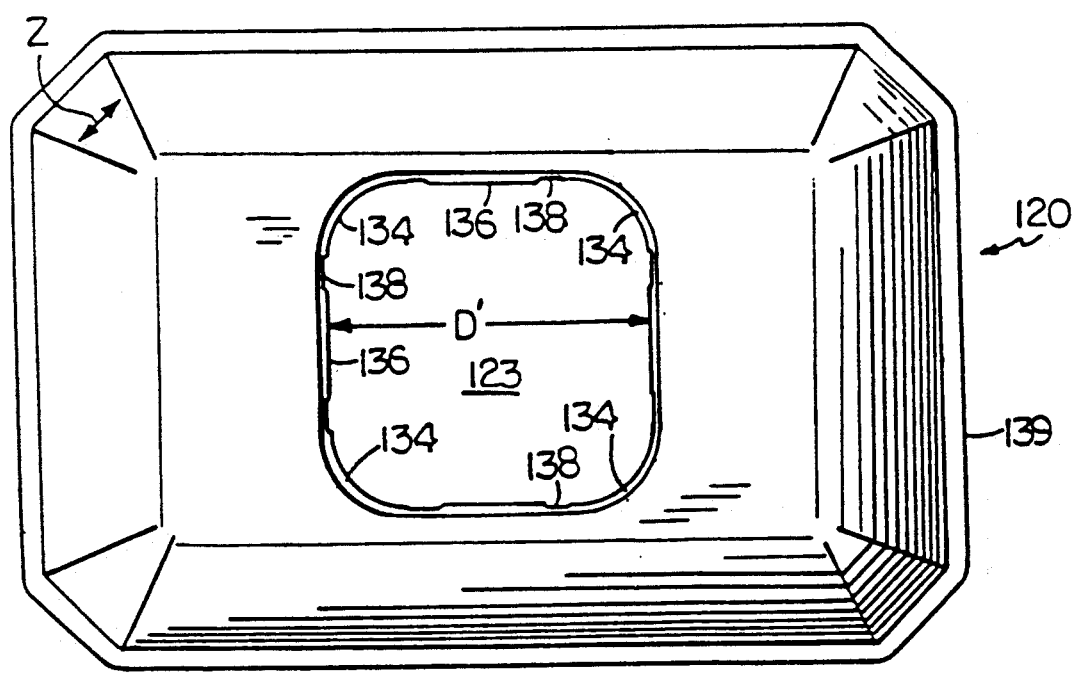

Referring to FIG. 7, filter dome 120 is formed of melt blown polyolefin of air permeable material, having a height A', e.g. 6.0 inches, a length B', e.g. 24.25 inches, and a width C', e.g. 16.25 inches. Aperture 123 is centrally located in the upper surface 127 of filter dome 120, and is sized and shaped to sealing fit with retaining seal 22', having a generally rectangular perimeter of width D', e.g. 8.19 inches, and rounded corners 134. Tongue regions 136 and groove regions 138 are provided for mating with retaining seal 22'. A flange 139 of width E', e.g. 0.53 inch, is provided around the perimeter of filter dome 120. Filter dome 120 is designed to allow rapid heat and moisture dissipation with a maximal unobstructed surface area. Light is diffused through dome 120, and flange 139 provides a positive seal at the edges of container 10'.

Figure 8:
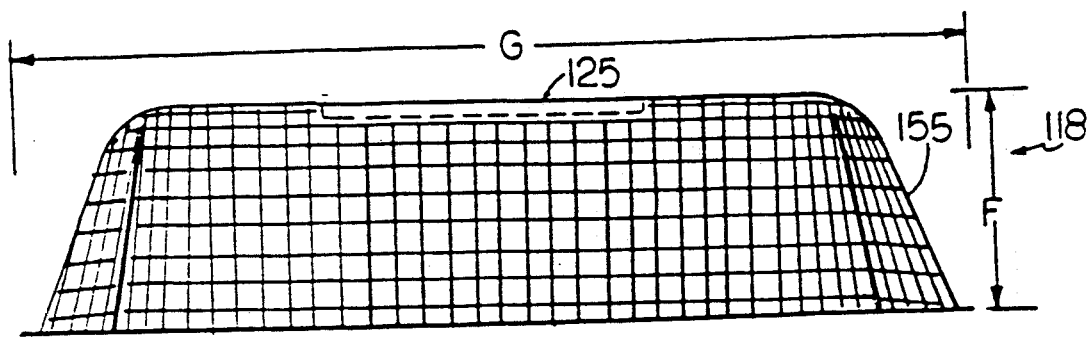
FIGS. 8, 8a and 8b are, respectively, a side view, end view and top view of a wire mesh load bearing dome.
Figure 8A:
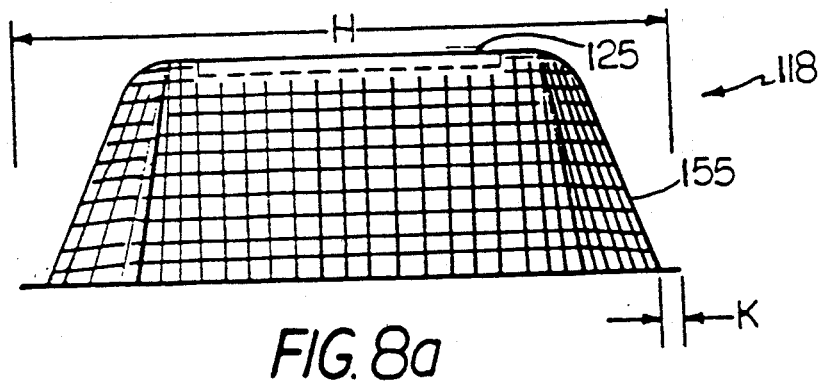
Figure 8B:
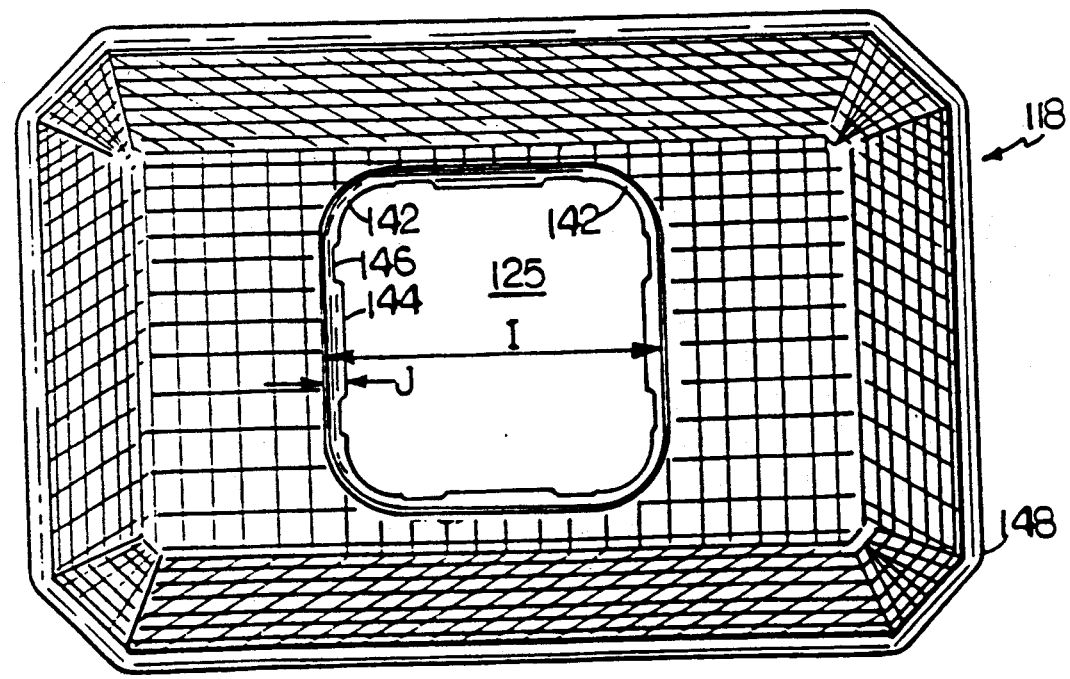

Referring to FIG. 8, load-bearing wire mesh dome 118 generally has an identical shape to filter dome 120 and is formed of galvanized steel wire mesh with a monocoque (i.e., load bearing) structure. It has a width H, e.g. 16.19 inches, a height F, e.g. 9.44 inches, and a length G, e.g. 24.19 inches. The corners of mesh dome 118 are bevelled, and sides 155 slope at an angle of about 75°. Centrally located aperture 125 is generally square with a width I, e.g. 7.63 inches, and has rounded corners 42, tongue regions 144, and groove regions 146. Groove region 144 has a width J, e.g. 0.53 inch. A flange 148 of width K, e.g. 0.5 inch, is provided around the perimeter of mesh dome 118. Once assembled to form a container 10', the edges of mesh dome 120 are covered by plastic, leaving no exposed sharp protuberances.

Referring to FIG. 6, container 10' is assembled by placing each of the components in a stack as shown, the base tray 12' having the non woven hydrophilic mat 114 positioned to completely cover trough 54, followed by wire mesh 116 (sized to fit within perimeter 52) positioned within the tray, followed by wire mesh, load-bearing dome and plastic filter dome. A hot melt adhesive 75, e.g. Bostick #8330 polyolefin base, is extruded around the entire inner part of perimeter 52'. When the components are assembled, they are clamped in place by a standard clamp or by a machine designed to hold flanges 139 and 148 closely in contact with wire mesh 116 and tray 12. The assembly is then placed at a temperature sufficient to melt adhesive 75 (e.g., 152°-176° F.) such that the adhesive passes through each of the layers. After cooling, the adhesive firmly holds the assembled components in their final position. Retaining ring 22' is then snap fit into apertures 125 and 123. Wire mesh 24' is placed above retaining ring 22' and cover 26' pushed into retaining ring 22' to firmly hold wire mesh 24' in place. Ring 22' and cover 26' prevent access to the edges of wire mesh 24'.

In still other embodiments, an aperture may be provided in the dome elements to allow a feeding device or watering device to be attached to container 10. In place of adhesive small staples may be provided to secure the components together. Such staples to not present a hazard to animals or humans since access to the container is through the aperture in the filter dome, and because the staples are positioned within lip perimeter 52 which makes the sharp edges of the staples inaccessible. The filter dome may be formed of material of a pore size which allows about 800 ft$^3$ air/min/ft$^2$ through it; such material will filter out air-borne contaminants in the atmosphere surrounding the container. The function of this filter is to prevent air-borne contaminants from infecting viral-antibody-free animals. Generally, filtration efficiencies of approximately 50% in the 1 thru 5 micron particle range, and 10% in the 0.3 to 1 micron particle range are suitable. These efficiencies improve as the filter's outer surface "cakes" with particles (and subsequently air flow diminishes). In another embodiment, the filter can be formed of perforated metal with the filter material laminated to its interior. This structure is further lined with a wire mesh form. Such a filter dome exposes only the most durable component of the structure, the load bearing perforated metal, to abrasion hazards in transit, thus preserving the dome's integrity. The wire mesh liner is reduced in material strength to act only as a barrier to prevent the animals from attacking the filter material.

We claim:

1. A container for containment and shipment of laboratory-type animals, comprising:

a base portion, and an upper portion, said base portion and said upper portion, when assembled, defining a volume for receiving one or more laboratory animals therewithin, said base portion defining an animal restraining barrier and comprising an outer element of liquid impermeable material, said base portion having a base surface lying substantially in a single plane, said base surface defining at least one protuberance extending generally below said plane, said protuberance being sized and constructed in a stack of containers to abut with an upper surface of an upper portion of a second container positioned below said container, in a manner to prevent lateral movement of a said container disposed upon the upper surface of the second container, said upper portion comprising an upper wall disposed generally parallel to said plane of said base surface in assembled state, and a side wall extending about the perimeter of said upper wall, between said upper wall and said base portion, said side wall, about at least a segment of the perimeter of said upper wall, lying at a substantial incline, the intersection of said side wall with said segment of the perimeter of the upper wall lying inwardly of the intersection of said side wall with said base portion, thereby providing a channel about said side wall, generally above the plane of the base portion, for flow of air between adjacent stacks of said containers, said upper portion further comprising at least one wall of material adapted for passage of air therethrough, said upper portion constructed in a manner for stacking a plurality of said containers, and said upper wall including an aperture defined through the upper wall for placement and removal of animals in said volume.

2. The container of claim 1 further comprising a translucent air passing filter element positioned about said upper portion.

3. A stack of containers for containment and shipment of laboratory-type animals, each container comprising:
- a base portion, and
- an upper portion, said upper portion constructed in a manner for stacking a plurality of said containers,
- said base portion and said upper portion, when assembled, defining a volume for receiving one or more laboratory animals therewithin,
- said base portion defining an animal restraining barrier and comprising an outer element of liquid impermeable material, said base portion having a base surface lying substantially in a single plane, said base surface defining at least one protuberance extending generally below said plane, said protuberance being sized and constructed in said stack of containers to abut with an upper surface of an upper portion of a second container in said stack positioned below a first container in said stack, in a manner to prevent lateral movement of said first container disposed upon the upper surface of said second container,
- said upper portion comprising an upper wall disposed generally parallel to said plane of said base surface in assembled state, and a side wall extending about the perimeter of said upper wall, between said upper wall and said base portion, said side wall, about at least a segment of the perimeter of said upper wall, lying at a substantial incline, the intersection of said side wall with said segment of the perimeter of the upper wall lying inwardly of the intersection of said side wall with said base portion, thereby providing a channel about said side wall, generally above the plane of the base portion, for flow of air between adjacent said stacks of the containers, said upper portion further comprising at least one wall of material adapted for passage of air therethrough, and
- said upper wall including an aperture defined through the upper wall for placement and removal of animals in said volume.

4. The stack of claim 3, each said container being positioned with the lower surface of a said base portion disposed above the upper surface of a said upper portion.

* * * * *